Figure 1:
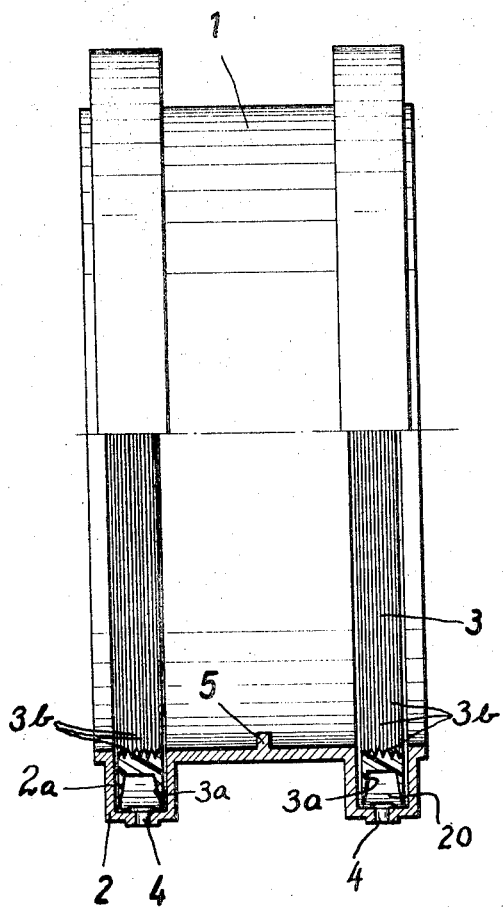

United States Patent

[11] 3,572,769

| [72] | Inventor | Johann Lingl |
| | | 70 Finninger St, Neu-Ulm, Donau, Germany |
| [21] | Appl. No. | 777,255 |
| [22] | Filed | Nov. 20, 1968 |
| [45] | Patented | Mar. 30, 1971 |
| [32] | Priority | Nov. 29, 1967 |
| [33] | | Germany |
| [31] | | L57978 |

[54] PIPE COUPLING
4 Claims, 2 Drawing Figs.

[52] U.S. Cl. ................................................. 285/96, 285/369
[51] Int. Cl. ............................................... F16l 17/02
[50] Field of Search .................................... 285/96, 97, 369

[56] References Cited
UNITED STATES PATENTS
2,922,664   1/1960   Risley et al. ................... 285/96
3,222,076   12/1965  Hollingsworth ............... 285/97X FOREIGN PATENTS
1,491,334   7/1967   France ........................ 285/97

Primary Examiner—Thomas F. Callaghan
Attorneys—Steward and Steward, Merrill F. Steward and Donald T. Steward ABSTRACT: A pipe coupling for joining the free ends of pipe, including a coupling sleeve and a pair of annular sealing rings that fit within channels on the inner surface of the sleeve, each channel being disposed so that it surrounds one of the pipes near its end and positions one of the sealing rings for engagement with the outer surface of the pipe. Each sealing ring is formed of a deformable material and is provided on its inner sealing surface with a plurality of annular ribs which deform when compressed inwardly into sealing engagement with the surface of the pipe. A filler compound that is initially, at least, sufficiently flowable to be injected into the channels around the sealing rings expands as it sets, compressing the sealing rings inward and forcing the ribbed inner surfaces of the rings into sealing engagement with the pipes.

Inventor:
JOHANN LINGL
By Steward & Steward
his ATTORNEYS.

PIPE COUPLING

This invention relates to a pipe coupling for joining together the free ends of pipes, such as sewer pipes.

Couplings for sewer pipes have been made heretofore with a tubular sleeve that has two annular grooves or channels axially spaced apart on its inner surface, each channel being adapted to receive a cup seal of U-shaped cross section, the annular channels serving to accommodate a liquid compound which is expanded by virtue of being introduced into the channels and which sealingly thrusts the inner face of each cup seal against the outer surface of the respective pipe end which it surrounds.

However, in known systems of the kind referred to above, the cup-seal surfaces which bear on the pipe ends are smooth, and the compound introduced into the system must not shrink on setting. Proper sealing of such a pipe joint is ensured only if the pipe ends have a nonporous and otherwise smooth or regular surface, if the pipes to be joined to each other do not alter their relative position, and then only for as long as the resilience of the material of the cup seal pressed into position does not diminish due to aging.

An object of the invention is to adapt a system of the kind heretofore described to the special conditions of sewer pipes and to ensure reliable and maintenance-free sealing action even if the sealing surface is uneven or porous as in the case of earthenware pipes or cast pipes as well as in the event of changes in the pipeline run.

The problem is solved with a pipe coupling according to the invention in which the surfaces of each of the cup seals that bear on the pipe ends are provided with resilient annular ribs and the filler compound is a self-setting material which expands as it hardens, said ribs being so shaped that under the effect of expansion of the filler compound they bear against the outer surface of their respective pipe ends to provide a seal while being simultaneously deformed so that they contact the pipe completely around its circumference even though the surface may be irregular. The annular channels of the jointing sleeve must therefore be filled with a fluid compound which expands and sets after being introduced.

The prior art also discloses pipe couplings in which a single common annular seal, filled with pressure medium, is disposed in a single annular joint-sleeve groove over the pipe joint, its internal surface having annular ribs which are thrust, by virtue of the mechanical pressure acting on the pressure medium charge, against the end surfaces of the pipes where it provides a sealing action. However, owing in particular to the common annular seal surrounding the pipe joint this system does not satisfy the special conditions encountered in sewer pipes.

It is also known to fill the seals of pipe joints with a compound which swells under the effect of the medium conducted in the pipeline. However, such a compound does not set and must be constantly wetted by the medium conducted in the pipeline, a condition which is not ensured in sewer pipes.

The advantages obtained according to the present invention are due in particular to the fact that owing to the construction of the cup seals, not only do the seal surfaces which bear on the pipe ends adapt themselves to the irregularity of the pipe surface but there is also a volume reserve for the compound which expands on setting so that overstressing of the coupling sleeve is eliminated. Expansion during setting of the filler compound introduced into the joint ensures that the compound need be introduced only with a small filling pressure but nevertheless produces a high sealing pressure.

Figure 2:
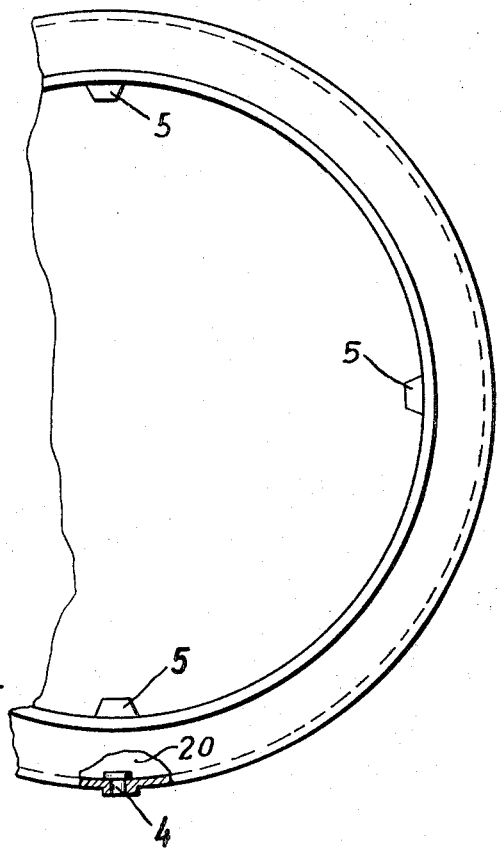

In order that the present invention may be more readily understood, one embodiment thereof will now be described by way of example and with reference to the accompanying drawings in which:

FIG. 1 is a side elevation partially in longitudinal section of a pipe coupling according to the invention; and FIG. 2 is a partial end view of the pipe coupling shown in FIG. 1.

Referring to the drawings, a tubular coupling sleeve 1 is provided with two annular grooves or channels 2 which open at the inner surface of sleeve 1. Channels 2 each receive a sealing ring or cup seal 3 that is U-shaped in cross section and has a pair of sealing lips 3a that are spaced from each other and so proportioned that their outer surfaces bear against the sides 2a of the channel 2. The sealing lips 3a extend outwardly of the cup seal toward the base of the channel 2 in which it fits, thereby forming an annular cavity 20 within the channel around the cup seal 3. The cup seals 3 are made of a suitable, deformable material and may for example be a tough, resilient, rubberlike composition, such as neoprene.

The inner face of each cup seal 3 bears against the outer surface of one of the pipes (not shown) to be joined. A plurality of continuous annular ribs 3b are formed on the inner face of each seal for engagement with the pipe. In the embodiment of the invention illustrated in FIG. 1 the annular ribs 3b are sawtooth-shaped in cross section so that each rib has a thin inner edge which is readily deformed when it is compressed inwardly against the outer surface of the pipe so that it forms a precise seal therewith. An opening 4 to the outer surface of the coupling sleeve is provided in the base of each channel 2 for the introduction of a filler compound into the annular cavity 20 that surrounds the cup seal 3. The filler compound employed in accordance with the present invention is a composition which is at least initially liquid or capable of flowing into and completely filling the cavities 20 in channels 2 and which expands after it is confined within the channels, so that it compresses the cup seals 3 inward against the pipes. Such a composition may be for example an expanding concrete, such as a mixture of cement and aluminum powder.

In joining two lengths of sewer pipe by means of the coupling of the present invention, the cup seals 3 are placed in the channels 2 of sleeve 1, which is then slipped over the end of one of the pipes until the end of the pipe engages positioning lugs 5 that are located on the inner surface of sleeve 1 midway between the channels 2. One end of the second length of pipe is then fitted into the opposite end of sleeve 1 until it too engages positioning lugs 5. The filler compound is thereafter injected through the openings 4 into the cavities 20 surrounding cup seals 3 in order to compress the seals into sealing engagement with the pipes. If the filler compound is fairly free-flowing at the time it is injected, pressure is maintained on it until it sets either by keeping the injecting gun engaged with the opening 4 or by plugging the opening.

The filler compound, being one that expands as it sets, forces the sealing cups 3 inward around the entire circumference of the pipe, deforming the annular ribs 3b against the surface of the pipe. Thus, an excellent seal is formed with the pipe which can not be obtained with sealing cups that have smooth inner surfaces because it is not possible to obtain full engagement of a smooth inner surface of the sealing cup or ring completely around the pipe. With the ribbed inner surface of the present invention, however, any nonuniformity in the concentricity of sealing ring and the surface of the pipe, of the inward movement of the seal against the pipe or in the surface of the pipe itself, such as flat spots or depressions, such nonuniformity is compensated for by movement of the ribbed surfaces into full engagement with the pipe surfaces due to the pressure exerted by the expanded filler compound and deformation of the annular ribs 3b as they come into engagement with the outer surface of the pipe.

It will be apparent moreover that because of the deformation of the resilient annular ribs 3b against the pipe a reasonable amount of settling or lateral sifting of the pipe in the coupling can be tolerated without breaking the seal due to the resiliency of the ribs 3b, which being initially deformed tend to remain in engagement with the surface of the pipe even if the position of the pipe is later disturbed.

I claim:

1. A pipe coupling comprising an open-ended tubular sleeve into the opposite ends of which fit the ends of the pipes to be joined, said sleeve having on its inner surface a pair of annular channels spaced from each other axially of said sleeve, one of said channels being disposed such that it surrounds one of the pipes adjacent its end and the other of said channels being similarly disposed with respect to the other pipe, a deformable annular cup seal of U-shaped cross section disposed within each of said channels with the opening of the U facing outwardly toward the base of the channel to form an annular cavity within said channel, the inner faces of said annular cup seals having a plurality of continuous annular ribs that bear against the outer surfaces of the pipes, an expanding filler compound filling each of said annular cavities and comprising a self-setting material which expands as it hardens and which is capable of being introduced into said cavities under relatively light pressure as a fluid and then of expanding as it hardens in order to thrust said inner faces of said cup seals against the outer surfaces of the pipes under relatively high pressure, said annular ribs being deformed under the pressure exerted by the expansion of said filler compound thereby sealing the entire surface circumferentially of each of the pipes and providing a volume reserve for said expanding filler compound in order to prevent overstressing said tubular sleeve.

2. A pipe coupling as defined in claim 1 wherein the outer surface of the pipe to be joined is relatively coarse, such as in sewer pipe, said annular ribs being resiliently deformable and tooth-shaped in cross section so that the inner edges of said ribs deform upon engagement with the pipe and conform to irregularities in the surface of the pipe.

3. A pipe coupling as defined in claim 1 wherein said filler compound comprises a fluid composition which expands and sets after being introduced into said cavities.

4. A pipe coupling as defined in claim 1 wherein said filler compound comprises a mixture of cement and aluminum powder that is initially fluid and which expands and sets after being introduced into said cavities.